UNITED STATES PATENT OFFICE.

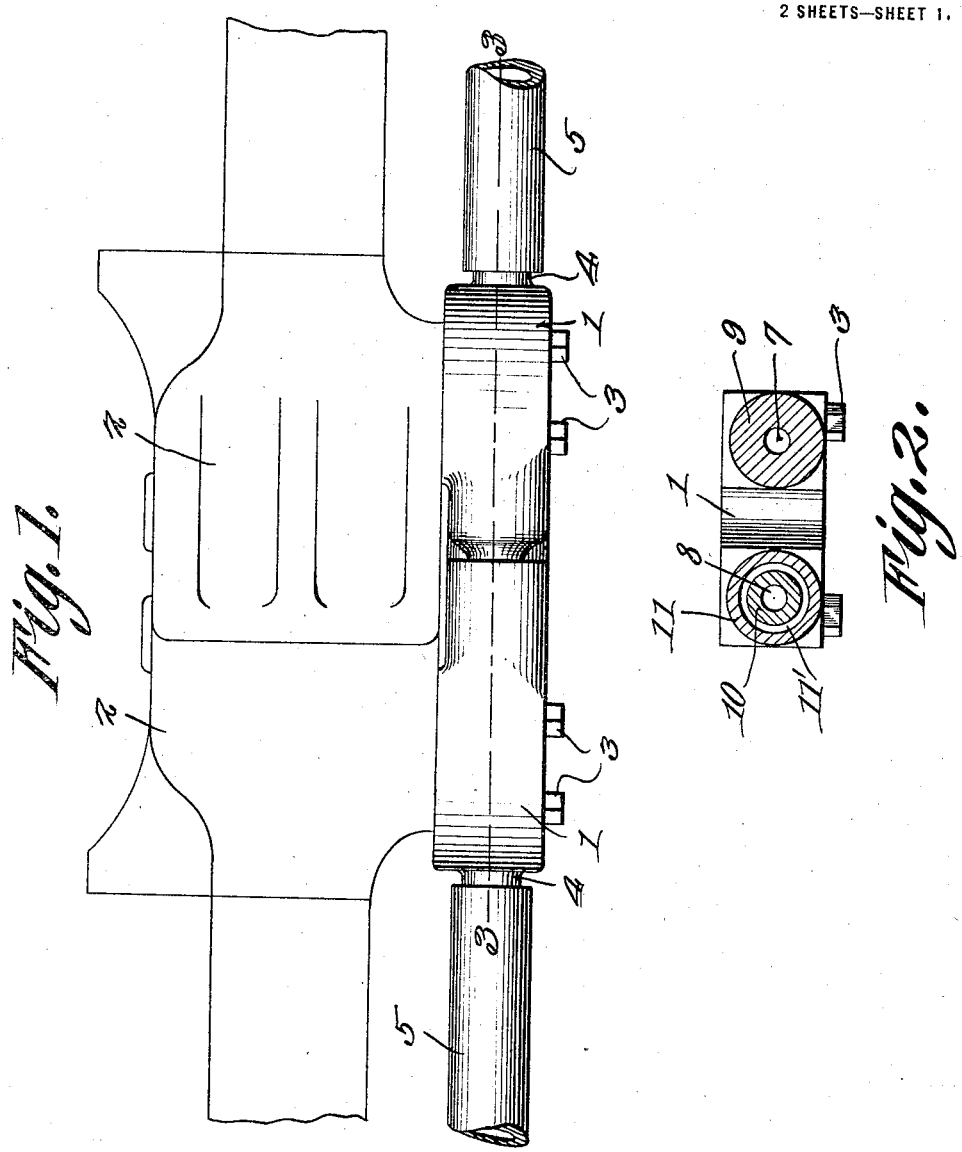

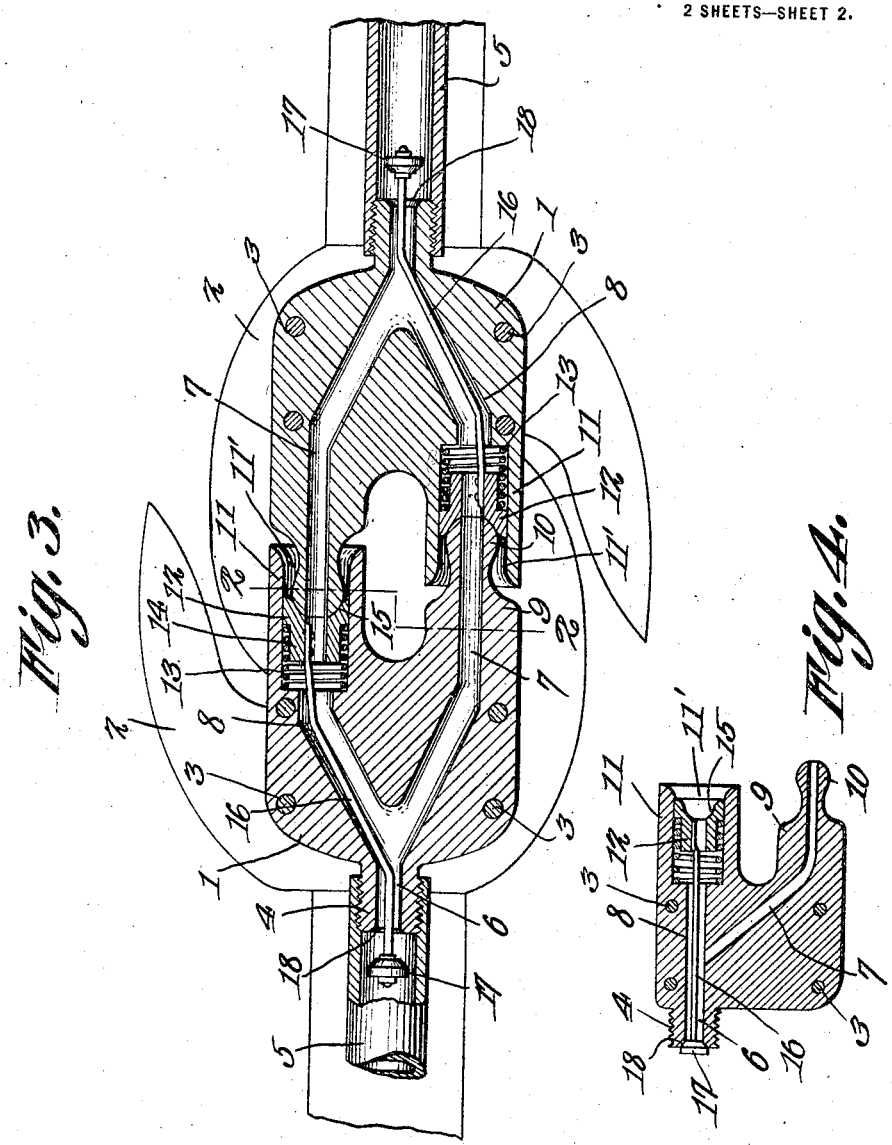

ELIGHA H. FIELD AND SAMUEL J. BUSHA, OF BUFORD, GEORGIA.

AIR AND STEAM PIPE COUPLING.

1,247,100.  Specification of Letters Patent.  Patented Nov. 20, 1917.

Application filed November 13, 1916. Serial No. 131,120.

*To all whom it may concern:*

Be it known that we, ELIGHA H. FIELD and SAMUEL J. BUSHA, citizens of the United States, residing at Buford, in the county of Gwinnett, State of Georgia, have invented a new and useful Air and Steam Pipe Coupling, of which the following is a specification.

The present invention appertains to couplers for the air and steam pipes of railroad cars, and aims to provide an automatic coupler for connecting the air or steam pipes of the cars when the cars are coupled together, thereby relieving the brakemen of this duty, and providing for other obvious advantages.

It is the object of the invention to provide a coupler of the nature indicated embodying coupling members of novel and improved construction, and provided with means for preventing the escape of the air or steam when the members are separated, the flow of air or steam through the coupler being established when the members are brought together.

It is also the object of the invention to provide an air or steam coupler of simple and inexpensive construction, which can be readily applied to car couplers, and which will serve its office in a satisfactory and efficient manner.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:

Figure 1 is a side elevation of the improved coupler as attached to a car coupler.

Fig. 2 is a cross section taken on the line 2—2 of Fig. 3.

Fig. 3 is a longitudinal section taken on the line 3—3 of Fig. 1.

Fig. 4 is a sectional view of one coupling member illustrating a modification.

The improved coupler embodies a pair of complementary members 1 adapted to be fastened to the coupler heads 2 of an ordinary car coupler, by means of bolts 3 or other securing elements, whereby the members 1 are brought together when the cars are coupled. The members 1 are provided at their remote ends with outstanding stems 4 upon which the ends of the air or steam pipes or hose connections 5 are threadedly or otherwise fastened.

The adjacent ends of the coupling members 1 are provided with interengageable means of such form that the members 1 will mate the same as the coupler heads 2. Each member 1 is provided with a passage 6 extending through the stem 4 into the body of the member 1, and said passage is bifurcated to provide the branches 7 and 8. The member 1 has a pair of laterally spaced extensions or bosses 9 and 11 projecting longitudinally from that end remote from the stem 4, and the extension 9 has a reduced head 10 at its end provided with a spherical surface, while the extension of boss 11 is provided with a counter bore 11' for loosely receiving the head or nipple 10 of the companion member 1, the two members being of duplicate construction but being in reversed positions. The branch passage 7 extends into and through the extension or boss 9 and nipple or head 10 thereof, and the branch passage 8 extends to that end of the counter bore or recess 11' opposite to the mouth thereof. The mouth of the recess 11' is flared to assist in directing the head or nipple 10 of the other member 1 into the recess. Each member 1 is thus provided with the female extension 11 for the reception of the head or nipple 10 of the other member, and with a male extension 9 provided with the head or nipple 10 to enter the female extension of the other member 1. This provides for the matching of the members 1, since the members will be in the same position relative to the ends of the respective cars.

Slidable within the recess 11' of each member 1 is a gasket member 12 which is yieldably moved toward the mouth of the recess by means of a coiled wire expansion spring 13 housed within the recess and confined between the member 12 and the shoulder formed between the recess and branch passage 8. The gasket member 12 has a tubular extension 14 projecting within the spring, and the member 12 has a concaved socket 15 in which the head 10 of the other member 1 is seatable snugly to provide a tight joint, which is preferably ground. The head 10 having a spherical surface can seat snugly in the socket 15 and swing in various directions without causing a leak, thereby permitting the two members 1 to swing or vibrate relative to one another due to the motion of the cars.

A rod 16 has one end attached to the extension 14 of the gasket member 12 of each coupling member 1, and extends through the branch passage 8 and passage 6 beyond the end of the stem 4, and a valve 17 is secured upon the other end of the rod 16 and is seatable against the valve seat 18 with which the end of the stem 4 is provided when the spring 13 moves the gasket member 12 sufficiently due to the separation of the coupling members.

In operation, when the cars are coupled, the members 1 are brought together when the coupler heads 2 move into engagement, the heads 10 being directed into the recesses 11', and will seat in the sockets 15 so as to move the gasket members 12 with the heads 10 against the tension of the springs 13. The springs 13 will thus hold the gasket members 12 seated tightly against the heads 10, to prevent leakage, and when the gasket members 12 are thus moved, the rods 16 being moved by the gasket members will remove the valves 17 from their seats 18, thereby establishing the flow of air or steam through the coupler between the pipes or hose connections 5. The members 1 can swing or vibrate relative to one another due to the slight swinging movements which the heads 10 are permitted to have in the sockets 15 without causing a leak, the gasket members 12 being continually moved against the heads or nipples 10 by spring tension. When the cars are uncoupled, the members 1 being separated, will release the gasket members 12 which in being moved by the springs 13 will pull the rods 16 with them to seat the valves 17, thus preventing the escape of air or steam. The valves 17 in being seated will also limit the movement of the gasket members 12, whereby they will not be forced out of the recesses 11'.

Fig. 4 illustrates the stem 4, passages 6 and 8, recess 11' and extension 11 all in alinement, whereby the rod or stem 16 can be straight instead of bent as illustrated in Fig. 3. Either form can be used, however, as desired.

Having thus described the invention, what is claimed as new is:

A coupler of the character described embodying a coupling member having a stem at one end, a laterally spaced recess and nipple at the other end, and a passage extending through the stem and provided with branch passages extending to the recess and nipple, the nipple being receivable by the recess of a companion coupling member, a spring pressed gasket member within the recess for the engagement of the corresponding nipple of the companion coupling member, a rod extending through the stem and passage and connected to the gasket member, and a valve carried by the rod seatable against the stem when the gasket member is released.

In testimony that we claim the foregoing as our own, we have hereto affixed our signatures in the presence of two witnesses.

ELIGHA H. FIELD.
SAMUEL J. BUSHA.

Witnesses:
J. A. BLANKENSHIP,
J. F. DISSPAIN.

Copies of this patent may be obtained for five cents each, by addressing the "Commissioner of Patents, Washington, D. C."